V. HALL.
Refrigerating Device.
No. 854. Reissued Nov. 22, 1859.
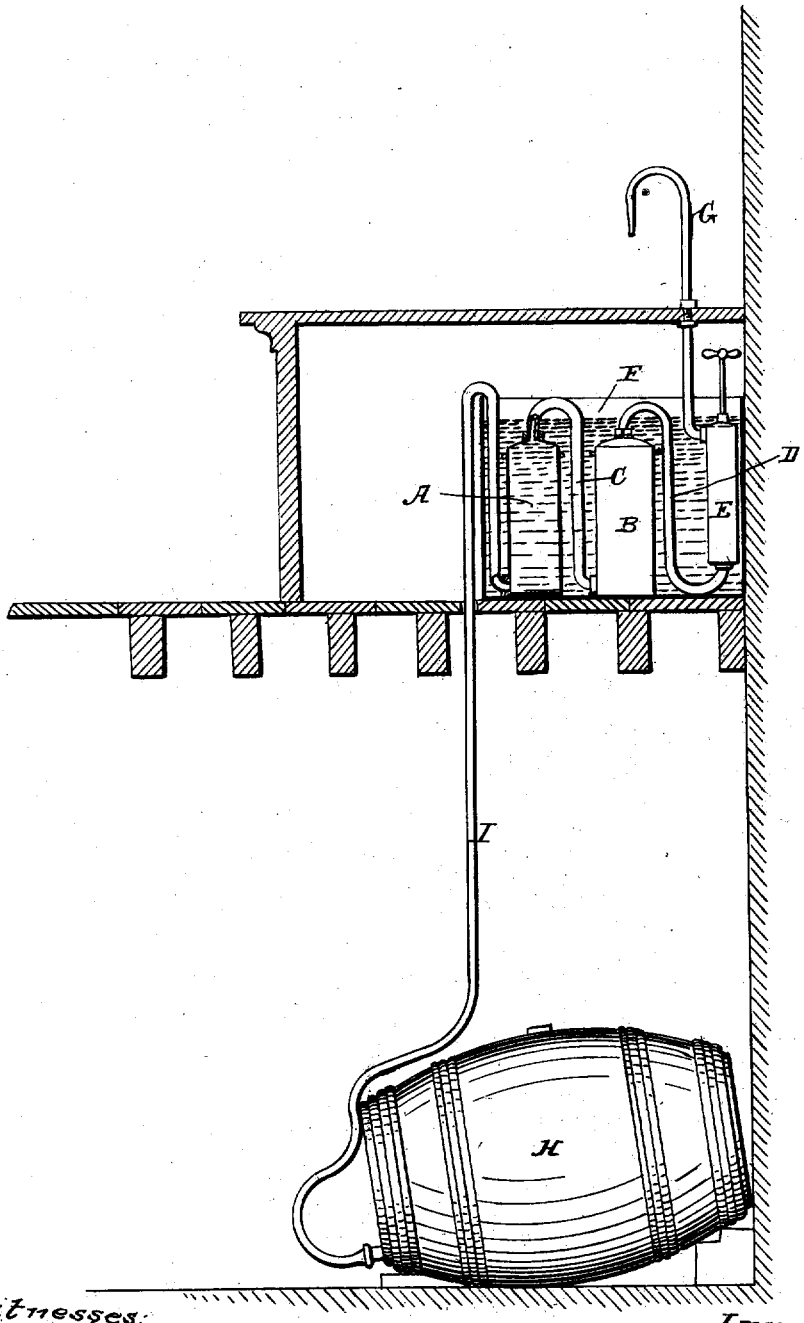
Witnesses:
Thomas King
John Toolan
Inventor:
Valentine Hall
N. PETERS. Photo-Lithographer, Washington, D. C.

UNITED STATES PATENT OFFICE.

B. M. KING, EXECUTRIX OF V. HALL, OF NEW YORK, N. Y.

IMPROVEMENT IN APPARATUS FOR COOLING LIQUIDS.

Specification forming part of Letters Patent No. 25,505, dated September 20, 1859; Reissue No. 854, dated November 22, 1859.

*To all whom it may concern:*

Be it known that I, BERRESFORD MARIA KING, of the city, county, and State of New York, executrix of the last will and testament of VALENTINE HALL, deceased, who resided in New York aforesaid, do hereby declare that the said VALENTINE HALL did invent new and useful Improvements in Apparatus for Cooling Liquids; and I do hereby declare that the following is a full, clear, and exact description of the same, reference being had to the annexed drawing making a part of this specification, said drawing being a side elevation of his invention, partly in section and applied to a cask of liquor on draft.

This invention consists in placing one or more receivers, with or without a pump, within a tank supplied with ice-water or water at a low temperature, and connecting together said receiver or receivers and the pump, if one be used, by means of a siphon or siphons, which are placed in communication with the supply-pipe, the whole being arranged substantially as hereinafter described, whereby liquids may be drawn in a cool state direct from the supply-pipe, and the refrigerating device readily cleansed when necessary, all the parts being rendered very accessible.

To enable those skilled in the art to fully understand and construct the invention, I will proceed to describe it.

A B represent two receivers, which may be constructed of copper and tinned on their inner side. These receivers may be of any proper size, and they are connected and made to communicate with each other by a curved pipe or siphon, C, said pipe or siphon connecting the upper part of A with the lower part of B. The receiver B is connected by a curved pipe or siphon, D, with a pump, E, which may be of the usual or any proper construction.

The receivers, as well as the pump, are placed within a tank, F, which is supplied with ice-water, or water at a low temperature, the latter extending above the receivers and pump—at least it would be preferable to have the receivers and pump fully submerged. The pump E has the usual discharge-pipe, G, attached to it.

The receiver A is connected with the barrel H of liquor, which is placed in a cellar below the tank, by means of a siphon, I, the latter extending over the edge of the tank, and communicates with the lower part of A, as plainly seen in the drawing.

From the above description it will be seen that by producing a vacuum in the receivers A B by means of the pump E the receivers will immediately fill with liquor from the barrel H, and as it is drawn for use from the receivers A B by the pump the receivers will be correspondingly supplied from the barrel H. The liquor, therefore, will be cooled in the receivers before being used, and will, so long as the tank is supplied with ice-water, be drawn in a cool state.

The pump E, it will be seen, also, in consequence of being submerged within the tank, serves as a refrigerator, and the siphons C D I serve as refrigerators, exposing the liquid to a greater cooling-surface than if simple connecting-pipes were employed, and also permitting the receivers to be more readily detached from each other in case they require to be removed from the tank for repairs or other purposes. If, for instance, the siphon I were not employed and a vertical pipe used instead, communicating with the bottom of receiver A, said pipe would, in case the receivers required to be removed from the tank, have to be disconnected below the tank and a hole made in the bottom of the tank to allow the pipe to pass through. This plan would not only occasion great embarrassment in removing the receivers from the tank, but it would also render the tank liable to leak—a contingency which is fully avoided by this arrangement.

The whole device, including the receivers, siphons, and pump, may be readily cleansed by disconnecting the barrel H from the lower end of the siphon I and placing the latter in a vessel of water or any suitable cleansing fluid, and by means of the pump drawing the same up through the receivers and forcing it out therefrom until a thorough cleansing is effected.

The above description refers to that application of the invention which requires a pump in order to draw the liquid through the siphons and receivers, but in certain cases a pump is not required—as, for instance, where the pipe I is attached to a pipe or reservoir containing a liquid under static pressure. In this case an additional receiver might be used in place of the pump. This latter application of the invention is important, for in cities which are supplied with water under pressure—as New York, for instance, which is supplied with the Croton—the apparatus may be applied directly to the supply-pipe and cool water received direct from the pipe. The invention, therefore, is capable of very general application.

The invention may also be applied to ships and prove very valuable. The tank F may in this case be supplied with water drawn by a pump from the sea below the keel of the vessel, at which point, in vessels of medium draft, the water is of sufficiently low a temperature to cool the liquid in the receivers.

Receivers have been placed in vessels containing water at a low temperature in order to cool liquids on draft; but I am not aware that a receiver or receivers have been connected together by siphon-pipes applied to a supply-pipe and placed in a tank containing ice-water, or water at a low temperature, for the purpose specified. I, therefore, do not claim, broadly, the placing of receivers in a tank containing ice-water, irrespective of the arrangement herein shown; nor do I claim any part or parts which might, when separately considered and apart from their application, be construed as being set forth or shown in the patents of A. Hammer and James Boyle, respectively bearing date September 7, 1852 and May 17, 1859; but I, as executrix and in trust for the heirs of VALENTINE HALL, deceased, do claim as new, and desire to secure by Letters Patent—

1. The employment or use of one or more receivers, A B, with or without the pump E, placed on a tank, F, containing ice-water, or water at a low temperature, and connected together and to the liquid supply pipe, substantially as and for the purpose set forth.

2. The employment or use of one or more receivers, A B, placed within a tank, F, and connected with the barrel or cask H by means of a siphon, I, and with a pump, E, within or at the outer side of the tank, for the purpose set forth.

3. The combining of a pump, E, with one or more receivers, A B, connected together and made to communicate with each other by siphons C D, when said parts are submerged within a tank, F, and made to communicate with the cask or barrel H by means of a siphon, I, extending over the top of the tank, substantially as and for the purpose set forth.

BERRESFORD M. KING.

Witnesses:
W. TUSCH,
O. D. MUNN.